INVENTORS
JAMES W. CASPERS
CARLOS (NMI) NUESE
BY
ATTORNEYS

Feb. 23, 1965  C. NUESE ETAL  3,171,119
BINOMIAL SEQUENTIAL DETECTOR
Filed Oct. 11, 1961  3 Sheets-Sheet 3

INVENTORS
JAMES W. CASPERS
CARLOS (NMI) NUESE
BY
ATTORNEYS

United States Patent Office 3,171,119
Patented Feb. 23, 1965

3,171,119
BINOMIAL SEQUENTIAL DETECTOR
Carlos Nuese and James W. Caspers, both of San Diego, Calif., assignors to the United States of America as represented by the Secretary of the Navy
Filed Oct. 11, 1961, Ser. No. 144,518
9 Claims. (Cl. 343—5)
(Granted under Title 35, U.S. Code (1952), sec. 266)

The invention described herein may be manufactured and used by or for the Government of the United States of America for governmental purposes without the payment of any royalties thereon or therefor.

The present invention relates to a sequential signal detector and more particularly, to a binomial sequential signal detector.

Most of the search radar systems in use today depict a video or return signals on a display for operator interpretation. The effectiveness of the interpretation depends heavily upon the operator's ability to sense the presence of echoes or blips from distant targets. Small targets at long distances are difficult to detect because of interfering noise either picked up or generated by the radar receiver. Considerable effort has gone into the problem of reducing this noise or increasing the signal-to-noise ratio. However, the noise cannot be eliminated, and this results in a limit of radar range or target size for a given transmitted power. Various approaches have been taken to eliminate the shortcomings incident to the use of the present method of detection and classification of targets by the human operator.

An approach to the shortcomings of the use of the human operator is automatic detection based upon statistical theory. In such a system, a machine rather than a human is used for detecting targets, i.e., the process of deciding between signal and noise. Increases in radar range are expected to result when the more efficient methods of automatic detection are used.

One mode of operation is to employ a detector which detects signals on a basis of a fixed number of observations and is therefore called a fixed-sample detector. In such a system, the usual scanning radar system receives a fixed number of observations for a target on each scan of the antenna, controlled by the antenna beam width, the antenna scan rate, and the pulse repetition rate. Fixed sample detectors are ideal for such a system in that the detector decides either for signal or noise on the basis of these observations. The detector can be adjusted to provide a known false alarm probability as well as known miss probability for a signal of a specified strength. The detectors can be optimum in the sense that for a given false alarm probability the detector has the least chance of missing a signal if one is present.

However, in a fixed sample detector the number of observations is fixed as well as the antenna scan rate which leads to unnecessary observations being made.

The low average scan rate associated with fixed sampled detectors with a given miss probability means that fewer relative opportunities are provided to detect a target in that a lower number of scans may be made across a particular sector and the radar range is consequently decreased.

An object of the present invention is to provide a binomial sequential detector having a high average scan rate for a given false alarm rate and miss probability.

Another object of the present invention is to provide a binomial sequential detector which increases the effective range of the radar system.

A further object of the invention is to provide a binomial sequential detector wherein the number of observations is not fixed.

A further object of the present invention is to provide a binomial sequential detector for a radar system wherein the antenna of the system is held in position only long enough to decide between target and noise.

Another object of the present invention is to provide a detection system wherein a small average number of observations is required.

An additional object of the present invention is to provide a binomial sequential detector which results in a simplification relative to a non-quantized sequential detector of equipment involved in the detection process.

A further object of the present invention is to provide a detection system which is near optimum and is subject to programming techniques for a digital computer.

An additional object of the invention is to provide a binomial sequential detection system which does not require a multiplicity of operators and wherein no human reaction times are involved.

Various other objects and advantages will appear from the following description of several embodiments of the invention, and the novel features will be particularly pointed out hereinafter in connection with the appended claims.

The invention will be described in greater detail by reference to the following description taken in connection with the accompanying drawings wherein like numerals pertain to similar elements in which.

Figure 1:
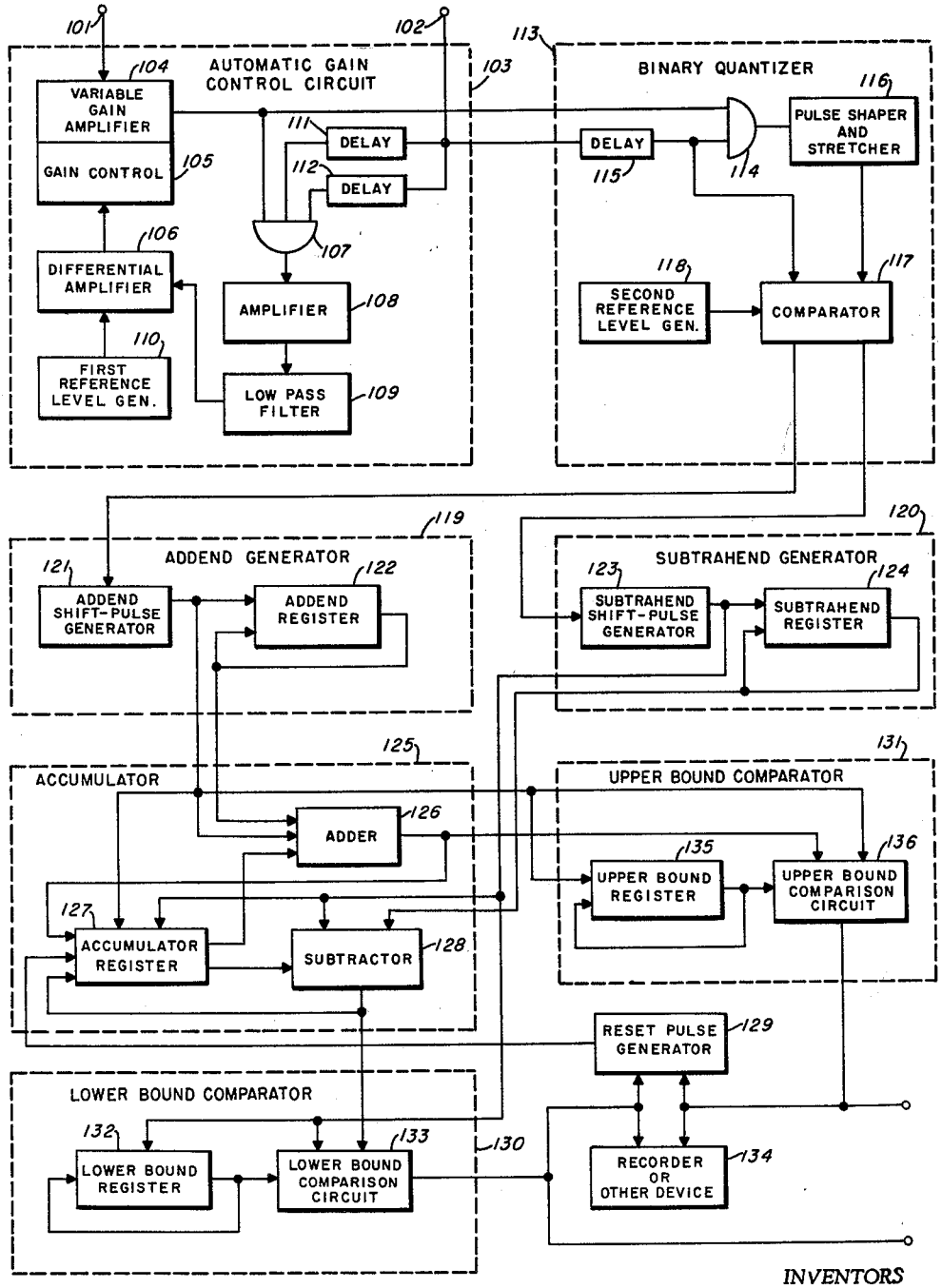
FIG. 1 is a block diagram of one embodiment of the binomial sequential detector.

Statistical methods of signal detection provide a rule for deciding between noise and signal. The rule involves some method of processing the radar video data and a criterion for deciding between noise and signal. Either analog or digital computer techniques are applicable in the detection process. Statistical methods recognize that in most applications, such as signal detection, the final decision can be in error, hence, when a signal is present there is some possibility of falsely proclaiming noise and, similarly, of proclaiming signal when there is only noise. The probability of the false alarm is the ratio of the number of false signal decisions to total number of decisions when noise is present in each case. Miss probability is defined in an analogous manner.

The detection or decision process is based upon a sample of one or more observations of the electromagnetic energy received by the radar antenna and filtered and amplified by the radar receiver. Video data are usually sampled by switching circuits which make their selection according to delay with respect to the transmitted radar pulse. The delay corresponds to the distance out to the region momentarily under surveillance and a multiplicity of ranges may require a number of detectors, each concerned with a particular range interval. If a directional antenna is used, as is usually the case, a signal decision by a detector indicates a target in the corresponding range interval in the direction of the antenna beam.

The detector must render a decision at the termination of the detection process although the decisions in favor of noise are usually not reported. Signal decisions may be displayed or utilized in a number of ways, the ultimate technique being automatic initiation of the proper tactical response.

A sequential detector controls the antenna scanning process by holding the antenna beam in one position during the detection process until the detection process terminates whereupon, the antenna beam is moved to the next position. This happens at each terminal decision in either the decision-for-signal or decision-for-noise case. Hence, the antenna looks in any given direction just long enough for the detector to reach a decision and no longer. This results in considerable savings in the scanning process.

A great advantage of the sequential detector is the usually small number of observations required. Although any particular process may require a large number of observations, the average is minimal, and is always less than that required for the fixed-sample detector. The savings range from around 30 percent to over 90 percent in detection time.

Since the number of observations or length of detection time varies from case to case, the antenna scans in an irregular manner in that the antenna must dwell on only any one fixed position until the sequential detection process terminates. The antenna dwell time thus varies with the number of observations required and the overall result is in increased average scan rate since the sequential detection process is usually faster than the fixed-sample detector.

When few or no targets are present in the medium being scanned, the average scan rate is determined by the detector's operation under the noise case. When the miss probability is set at about 0.2 and the false alarm probability is very small, large savings in the detector sample size or antenna dwell time results and yield a very significant increase in the antenna scan rate.

The increased average scan rate is achieved at the same miss probability as that of the slower fixed-scan-rate system. However, more opportunities are provided to detect the target, one for each scan, and the radar range is consequently increased. The higher average scan rate requires a reduction of the false alarm probability if the same false alarm rate is desired, however, studies show that this reduction is gained through insignificant loss in detection probability so that both longer range and higher scan rates are achieved through sequential detection.

In utilizing sequential detectors either analog or binomial detectors may be used, however, the binomial case is especially important since utilization of this technique leads to great simplification of the equipment with rather small losses in performance. The application of binomial techniques consists of converting the radar video into two states, either one or zero, by a quantizer. If the video voltage exceeds the quantizing level a one is generated; otherwise, a zero results. The sequential detector then performs the decision process on a data sequence of this type. The difference between the data for noise and that for signal is simply a change in the probability of obtaining ones. The probability for a one out of the quantizer increases in the signal case, however, appearance of a one is not usually interpreted as a signal but rather, a sequence of ones could result in a signal decision from the detector. The sequential detector also has a random sample size or decision time and results in quicker decisions, on the average, than those of the corresponding fixed-sample detector and the extreme quantization results roughly in a 50 percent increase in the detection time over the non-quantized sequential detector.

In the embodiment of the invention as set forth in FIG. 1 receiver video voltage from the radar receiver in the radar system is coupled to an input terminal 101 while a clock pulse which is incident with the transmitted pulses from the radar transmitter is coupled to an input terminal 102. The clock pulses and the radar video voltage are introduced into the automatic gain control circuit 103 comprising a variable gain amplifier 104 to which the receiver video voltage is coupled. Connected to and forming part of the variable gain amplifier is a gain control 105 which is controlled by the output of a differential amplifier 106. The output of the variable gain amplifier 104 is coupled to an AND gate 107 which removes most of the anticipated signal energy in a manner to be explained subsequently. The output of the gate 107 is introduced into an amplifier 108 and thence into a lowpass filter 109. The output of filter 109 forms one input to the differential amplifier 106. Another input to the differential amplifier comprises the output of a first reference level generator 110 which establishes a predetermined reference level.

Clock pulses coupled to input 102 are introduced through a pair of delay lines 111 and 112 to gate 107 and are used to control the interval during which the radar video voltage is sampled or treated in the automatic gain circuit.

The output of the variable gain amplifier and the clock pulses from input terminal 102 are also introduced into a binary quantizer 113 which includes an AND gate 114, one input of which is coupled to the output of the variable gain amplifier 104 and the other input of which comprises the output of a delay line 115. The input to delay line 115 comprises clock pulses which are received on input terminal 102. The output of AND gate 114 is introduced into a pulse shaper and stretcher 116 and then the treated pulses from the shaper and stretcher 116 are introduced into comparator 117. One input to the comparator 117 comprises the output of delay line 115, a second input to comparator 117 comprises the output of the shaper and stretcher 116, while the third input comprises the output of the second reference level generator 118. Coupled to the output of the comparator 117 are an addend generator 119 and subtrahend generator 120.

Included in the addend generator 119 is an addend shift pulse generator 121 which produces a sequence of addend shift pulses when activated and coupled to the output of the pulse generator 121 is an addend register 122. The output of the addend register 122 is coupled to the input so that the contents of the register are recirculated.

The subtrahend generator 120 includes a subtrahend shift pulse generator 123 which is coupled to the output of the comparator and a subtrahend register 124 which is coupled to the output of the subtrahend shift pulse generator 123. The output of the subtrahend register 124 is coupled to the input so that the contents of the subtrahend register 124 are recirculated.

After the addend and subtrahend pulses from comparator 117 are treated in the addend generator 119 and subtrahend generator 120 they are coupled to an accumulator 125 which includes an adder 126 having various inputs and one output. One input to adder 126 comprises the output of the addend shift pulse generator 121, a second input comprises the output of the addend register 122 and a third input comprises the output of an accumulator register 127 contained in the accumulator 125. Also included in the accumulator 125 is a subtracter 128 which has three inputs and a single output. One input to the subtracter 128 comprises the output of the subtrahend shift pulse generator 123, another input comprises the output of the subtrahend register 124, while the last input to subtracter 128 comprises the output of the accumulator register 127 previously mentioned.

The accumulator register 127 has various inputs one of which comprises the output of a reset pulse generator 129, another the output of the subtrahend shift pulse generator 123, another the output of the addend shift pulse generator 121, and the final two comprise the two outputs of the adder 126 and the subtracter 128. The output of the accumulator register 127 is coupled to the adder 126 and subtracter 128. Their output is recirculated and connected to the input of the accumulator register and accomplish a recirculation.

The two outputs of the accumulator 125 are then coupled to a lower bound comparator 130 and an upper bound comparator 131 respectively, the outputs of which represent a noise-only decision pulse or an object-present decision pulse, respectively.

Contained within the lower bound comparator 130 is a lower bound register 132 and lower bound comparison circuit 133. The input to the lower bound register 132 comprises the output of the subtrahend shift pulse generator 123 and a further input comprises the output of the lower bound register 132 which is recirculated. One input to the lower bound comparison circuit 133 comprises the output of the subtrahend shift generator 123, another input comprises the output of subtracter 128, and a third input comprises the output of the lower bound register 132. The output of the lower bound comparison circuit 133 is coupled as an input to the reset pulse generator 129 and is also coupled to a recorder or other device 134 for display or other utilization.

Included within the upper bound comparator 131 is an upper bound register 135 and upper bound comparison circuit 136. One input to the upper bound register comprises the output of the addend shift pulse generator 121 and the other input comprises the output of the upper bound register which is recirculated. One input to the upper bound comparison circuit is also the output of the addend shift pulse generator 121, another input comprises the output of adder 126, and the final input comprises the output of the upper bound register 135. The output of upper bound comparison circuit 136 is coupled to the reset pulse generator 129 and recorder or other device 134.

In the operation of the embodiment of FIG. 1 receiver video voltage from the radar receiver is coupled to input terminal 101. Contained in the receiver video voltage are noise and echoes received from objects illuminated by a sequence of transmitted pulses. The video voltage is amplified or attenuated by the variable gain amplifier 104 and gate 107 is used to select video from extremely long ranges where signal energies are small at low or moderate signal densities. Amplifier 108 is used to restore the energy passed to the total value due to noise. In either case the energy due to noise is filtered in lowpass filter 109 to obtain an average of the output due to noise alone. The average noise level of the output of the variable gain amplifier, together with the output of the first reference level generator 110, is coupled through differential amplifier 106 and if the average noise level exceeds the first reference level the difference is used to reduce the gain of the variable gain amplifier. Conversely, if the first reference level exceeds the average noise level of the output from lowpass filter 109 the difference is used to increase the gain control 105 on the variable gain amplifier 104. The gain control can be affected by using the output of the differential amplifier to adjust the bias in the variable gain amplifier. Thus, the effect of the automatic gain control circuit 103 is to set the average noise level at the first reference level while preserving the ratio of instantaneous voltage to average noise level.

The output of the automatic gain control circuit is then gated by a sampling gate. Synchronizing pulses coupled to input terminal 102 from the radar transmitter which marked the time of transmission of each transmitted pulse are delayed to account for the time required for the transmitted pulse to cover the desired range in delay lines 111, 112, and 115 and for the echo of any object which might be present at that range to return to the receiver. The delayed synchronizing pulses are used to gate the video in AND gate 114 so as to pass only the video return which might contain an echo from the desired range. With a sufficiently short gate the video will not have time to change value appreciably, and an approximately level pulse will be obtained. The gated video in the output of gate 114 is shaped and stretched to obtain rectangular sample pulses of suitable duration.

The sample pulses are compared with a second reference level which comprises the output of the second reference level generator 118 in the comparator 117 contained in the binary quantizer 113 which operates when triggered by the delayed synchronizing pulses. The second reference level will be related to the first reference level to which the average noise level has been set. If the sample pulse is as large as or larger than the second reference level an addend pulse is produced and coupled to the addend generator 121; conversely, if a sample pulse is less than the second reference level a subtrahend pulse is produced, which is coupled to the subtrahend generator 120.

The addend, proportional to $$\log \frac{p_1}{p_0}$$

where $p_1$ is the probability of getting an addend pulse when a signal is present, and where $p_0$ is the probability of getting an addend pulse when noise alone is present, is set in the addend register 122. The subtrahend, proportional to $$\log \frac{1-p_0}{1-p_1}$$

is set in the subtrahend register 124. A subtrahend pulse from the binary quantizer 113 starts the subtrahend shift pulse generator 123 which generates enough shift pulses to perform a subtraction and a comparison. When shifted by the subtrahend shift pulses from the subtrahend shift pulse generator 123, the contents of the subtrahend register 124 are shifted out to the subtracter 128 and also restored in the subtrahend register through the recirculating line from the output to the input of the register 124.

The accumulator register 127 is initially set at zero. Addend shift pulses from the addend shift pulse generator 121 shift the contents of the accumulator register 127 into the adder 126 where the addend is added. The sum is shifted out to the upper bound comparison circuit 136 and is also stored as the new contents of the accumulator register 127. Subtrahend shift pulses from the subtrahend shift pulse generator 123 shift the contents of the accumulator register 127 into the subtracter 128 where the subtrahend is subtracted. The difference is shifted out to the lower bound comparison circuit 133 and is in turn stored as the new contents of the accumulator register 127.

The upper bound, proportional to $\log ((1-\beta)/\alpha)$ where $\beta$ is the desired probability of a miss and $\alpha$ is the desired probability of a false alarm, i.e., $\alpha$ equals the probability of accepting $H_1$ when $H_0$ is true, and $\beta$ equals the probability of accepting $H_0$ when $H_1$ is true, is set in the upper bound register 135. $H_0$ is the hypothesis that noise alone is present and $H_1$ is the hypothesis that signal is present in noise. Addend shift pulses from the addend shift pulse generator 121 shift the contents of the upper bound register 135 into the upper bound comparison circuit 136 and also recirculate them in the upper bound register. The sum from the adder 126 is compared in the upper bound comparison circuit 136 with the upper bound. If the sum from the adder 126 is as large as or larger than the upper bound an object present decision pulse is generated.

The lower bound, proportional to $\log (\beta/(1-\alpha))$ a negative number, is set in the lower bound register 132. Subtrahend shift pulses from the subtrahend shift pulse generator 123 shift the contents of the lower bound register into the lower bound comparison circuit 133 and also recirculate them in the lower bound register. The difference from the subtracter 128 is compared with the lower bound in the lower bound comparison circuit and if the difference from the subtracter is equal to or more negative than the lower bound a noise-only decision pulse is generated.

An object present decision pulse, or a noise only decision pulse may be recorded in the decision recorder 134 or used directly. The reset pulse generator 129 which also receives the object present decision pulse or noise only decision pulse generates a reset pulse upon receipt of either decision pulse which is used to reset the contents of the accumulator register 127 to zero.

If surveillance of several ranges is desired, a common automatic gain control circuit 103 may be used, and the remainder of the equipment replicated for each additional range.

Figure 2:
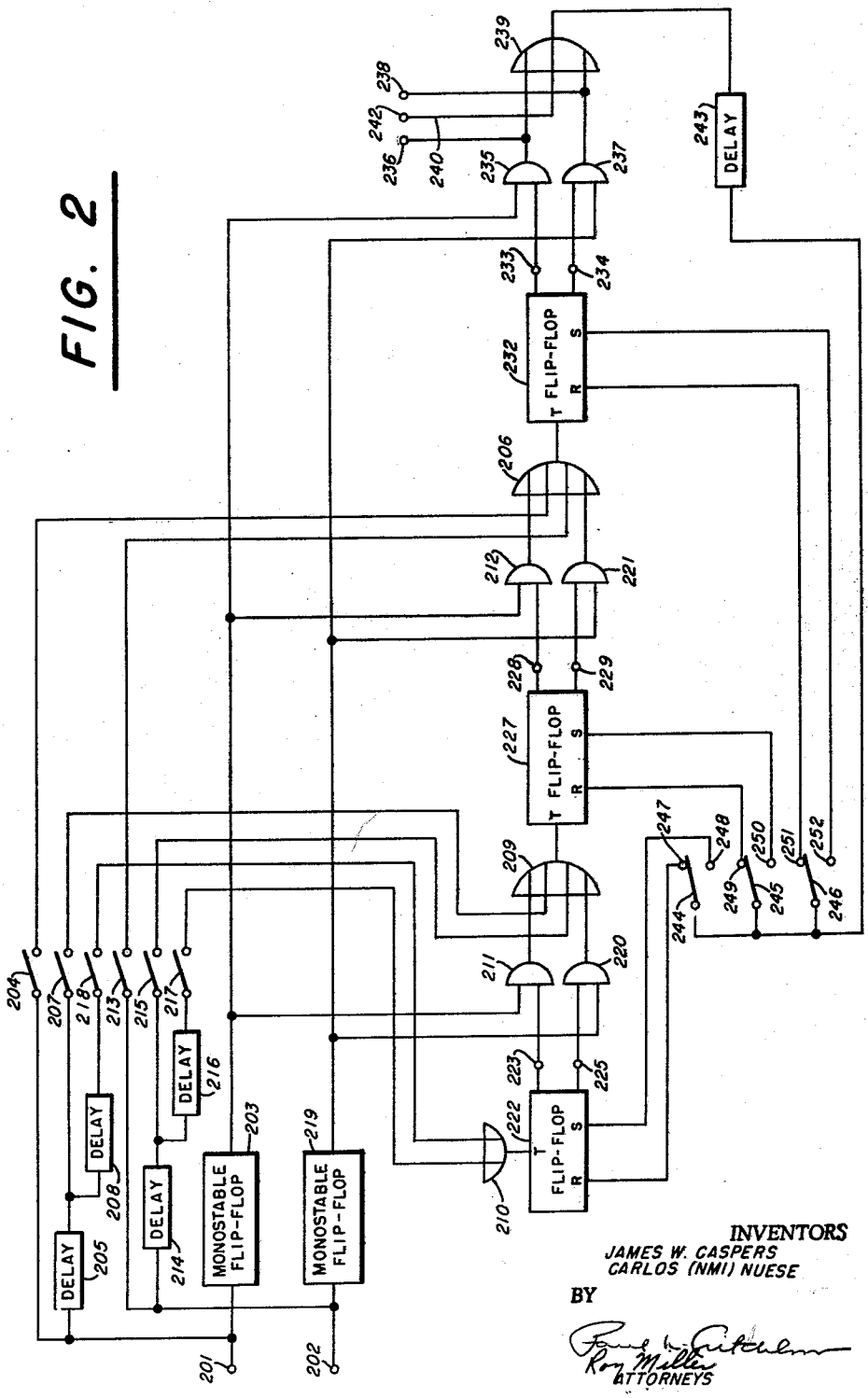
FIG. 2 is a schematic diagram of a modification of the invention using a reversible counting accumulating register.

The embodiment of the invention shown in FIG. 2 involves a modification using a reversible counting accumulating register or equivalent. In the embodiment of FIG. 2 only three binary digits are illustrated for simplicity of explanation, however, it is to be understood that any number would be permissible.

The modification shown in FIG. 2 would accept pulses from the binary quantizer of the embodiment of the invention shown in FIG. 1 and would replace the components beyond the binary quantizer. Addend pulses are coupled to the accumulating register on line 201 and the subtrahend pulse appears on line 202. The addend pulses are coupled to the input of a monostable flip-flop 203 the output of which is normally off; while the same addend pulse from 201 is coupled to one side of a single pole single throw switch 204 and to one side of a delay line 205. The other terminal of switch 204 forms one input to an OR gate 206. The output of delay line 205 is coupled to one side of a single pole single throw switch 207 and also forms one input to a delay line 208. The other side of switch 207 forms one input to an OR gate 209. The output side of delay line 208 is coupled through a single pole single throw switch 218 and forms one input to an OR gate 210. The output of the monostable flip-flop 203 which is normally off is connected so as to form one input to AND gates 211 and 212.

Subtrahend pulses on line 202 are coupled to one side of a single pole single throw switch 213 and the other side of the switch forms one input to OR gate 206. The subtrahend pulses on line 202 also form one input to delay line 214 whose output is coupled to one side of a switch 215 and to the input side of a delay line 216. The other side of switch 215 forms one input to OR gate 209. The output side of delay line 216 is coupled through a single pole single throw switch 217 to the input side of OR gate 210.

The subtrahend pulses are also coupled to the input side of a monostable flip-flop 219 which is normally off. The output of flip-flop 219 forms one input to AND gate 220 and also forms one input to AND gate 221.

The output of OR gate 210 is coupled to the T input on RST flip-flop 222. An RST flip-flop has three inputs, i.e., reset, set, and toggle inputs. RST flip-flop 222 also has an output carry terminal 223 which is coupled to the input side of AND gate 211 and a borrow output terminal 225 which is coupled to the input of AND gate 220. The outputs of AND gates 211 and 220 form two of the inputs to OR gate 209.

The output OR gate 209 is connected to the T terminal of an RST flip-flop 227 which has an output carry terminal 228 and borrow terminal 229. The carry output at 228 is coupled to the input of AND gate 212 while the borrow terminal is coupled to AND gate 221. The outputs AND gates 212 and 221 form two of the inputs to OR gate 206.

The output of OR gate 206 is connected to the T terminal of RST flip-flop 232 which has an output carry terminal 233 and output borrow terminal 234. The carry output from 233 is coupled to AND gate 235, while the borrow signal at the borrow output 234 is coupled to AND gate 237.

The enabling pulse for AND gate 235 is coupled from the output of flip-flop 203 while the enabling pulse for AND gate 237 is coupled from the output of flip-flop 219. The outputs of AND gates 235 and 237 form two inputs to OR gate 239. A third input to OR gate 239 is coupled from start line 240. The output of OR gate 239 represents a reset pulse which is coupled to the input side of delay line 243. The output of delay line 243 is connected to one pole of single pole double throw switches 244, 245 and 246. Switch contacts 247 and 248 of switch 244 are connected to the reset and set lines respectively of flip-flop 222 while switch terminals 249 and 250 of switch 245 are connected to the reset and set lines of flip-flop 227; and finally switch contacts 251 and 252 are connected to the R and S lines respectively of flip-flop 232.

From the binary quantizer 116 of FIG. 1 an addend pulse on line 201 or a subtrahend pulse on line 202 would be received for each sample pulse which has been quantized. The addend pulse and subtrahend pulse are used to trigger the appropriate monostable flip-flop 203 or 219 depending on which line a pulse is received and the output of which is normally off, but remains on for a suitable period of time immediately after it has been triggered. Each of the flip-flop stages 222, 227 and 232 shown in the present embodiment has a T input which will cause the flip-flop to change state if triggered, and inputs which will set it at zero or one, i.e., an R and S input, a carry output which will be energized when a flip-flop triggers from one to zero, and a borrow output which will be energized when the flip-flop changes state from zero to one. That is, a carry pulse appears at 223 when flip-flop 222 changes from 1 to 0 and a borrow pulse appears at output 225 when flip-flop 222 changes from 0 to 1.

The addend pulses and subtrahend pulses are also passed through delay circuits 205, 208, 214 and 216, the outputs of which are connected through the switches shown for the addend number in the case of the addend pulse, and a set of switches 213, 215 and 217 for the subtrahend number in the case of the subtrahend pulse. Each set of switches represents a binary coded number with $n$ binary digits, one for each switch. Each line from the addend and subtrahend switch sets is connected to initiate a count at the appropriate stage of the accumulating register. If a count applied to a stage, i.e., flip-flop 222, 227 or 232, would cause a borrow from the next stage in subtraction, and the subtract monostable flip-flop is energized, the next stage is triggered through an AND gate as at 220 or 221. If the count applied to a stage would cause a carry to the next stage in addition, and the add monostable flip-flop 203 is energized the next stage is triggered through an AND gate 211 or 212. Delay is used in initiating the lower order stages, i.e., 222 and 227 so as to avoid interference between count initiation and borrow or carry operation.

By suitably altering the inequality to be tested from $$\log B < \log \lambda < \log A$$

to:

$$0 < \log \lambda + \log \left(\frac{1}{B}\right) < \log A + \log \frac{1}{B}$$

and to:

$$0 < \frac{\log \lambda}{\log A + \log \left(\frac{1}{B}\right)} + \frac{\log \left(\frac{1}{B}\right)}{\log A + \log \left(\frac{1}{B}\right)} < 1$$

to:

$$0 < (2^n + 1) \frac{\log \lambda}{\log A + \log \left(\frac{1}{B}\right)} +$$

$$(2^n + 1) \frac{\log \left(\frac{1}{B}\right)}{\log A + \log \left(\frac{1}{B}\right)} < (2^n + 1)$$

and finally to:

$$-1 < (2^n + 1) \frac{\log \lambda}{\log B + \log \left(\frac{1}{B}\right)} +$$

$$(2^n + 1) \frac{\log \left(\frac{1}{B}\right)}{\log A + \log \left(\frac{1}{B}\right)} - 1 < 2^n$$

where $$\lambda = \frac{P_1(\vec{x})}{P_0(\vec{x})}$$

$A =$ upper bound;
$B =$ lower bound;
$P_1(\vec{x}) =$ probability under $H_1$ of observed results.
$P_0(\vec{x}) =$ probability under $H_0$ of observed results.

An initial quantity $$[(2^n+1)(\log 1/B)/(\log A+\log 1/B)-1]$$

is then preset into the accumulating register by the reset pulse from OR gate 239 and through the appropriate switches 244, 245 and 246 to make a binary coded number. Each addend pulse must cause the quantity $$(2^n+1)(\log P_1/P_0)/(\log A+\log 1B)$$

to be added, and each subtrahend pulse must cause the quantity $(2^n+1)[\log(1-P_0)/(1-P_1)]/(\log A+\log 1B)$ to be subtracted. Each of these three quantities must be approximated by the nearest integer, but, for large $n$ this will cause no appreciable error.

An increase in the contents of the accumulating register comprising flip-flops 222, 227 and 232 shown in FIG. 2, to $2^n$ or above will then be cause for an object present decision at output terminal 236, i.e., the object present decision will be accompanied by a carry pulse at 233 from the nth or highest order stage which in this case, is flip-flop 232 of the register (previously representing $2^{n-1}$) which carry pulse at 233 will be coupled to AND gate 235 and if an enabling pulse from flip flop 203 is present will be used as an object present decision pulse at 236. A minus sign will be cause for a noise only decision and will occur with a borrow pulse at 234 from flip-flop 233, which will be used as a noise only decision pulse at 238 when the borrow pulse and enabling pulse are coincident in AND gate 237. The reset pulse will be obtained from either the object decision pulse 236 or the noise only decision pulse at 238.

The foregoing discussions of the binomial sequential detector discuss the equipment for a detector capable of performing any binomial sequential detection process. However, in many practical situations a more specialized and simplified equipment might be used. In many cases where the signal is not grossly embedded in noise, i.e., positive signal to noise ratio, in db, to around −10 db, a detector can often be used where the addend, subtrahend, and upper and lower bounds are integers. These cases may be found through the usual and valid mathematical operation of addition and multiplication of the basic inequalities for the binomial sequential test.

Figure 3:
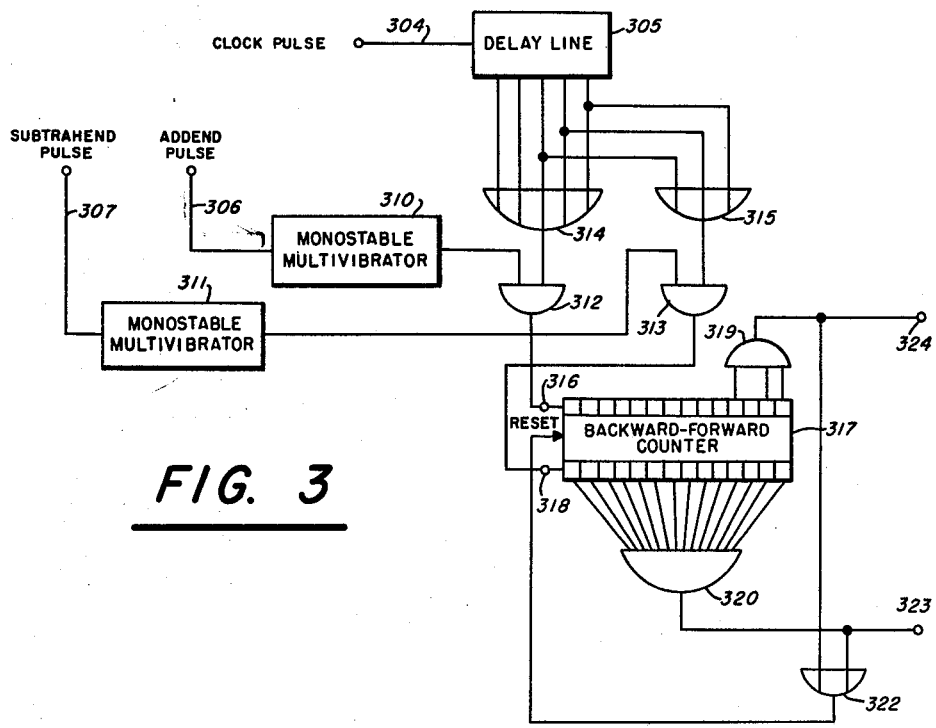
FIG. 3 is an embodiment of a simplified binomial sequential detector utilizing one delay line.

FIG. 3 illustrates one embodiment of a simplified binomial sequential detector. The system shown in FIG. 3 would replace the components of FIG. 1 beyond the quantizer. The addend pulses appear on line 306 while the subtrahend pulses appear on line 307. Synchronizing pulses or clock pulses from the output of delay line 115 of FIG. 1 appear and are coupled to the input of a tapped delay line 305 which in the present case has five output taps.

The output of the quantizer appears either on line 306 as a video level greater than or equal to the reference level of the quantizer, i.e., an addend pulse or as a subtrahend pulse representing a video level less than the quantizing level on line 307. The addend pulses appearing on line 306 are coupled to the input of a monostable multi-vibrator 310 while the subtrahend pulses are coupled to the input of a monostable multivibrator 311.

The monostable multivibrators 310 and 311 stay on, when triggered by the addend or subtrahend pulse, for a time slightly exceeding the delay time of delay line 305. In either case the multivibrator must reset to zero before the next addend or subtrahend pulse appears.

The output of monostable multivibrator 310 forms one input to AND gate 312 while the output of monostable multivibrator 311 forms one input to AND gate 313. The other input to AND gate 312 is the output of OR gate 314 which is connected to five output taps on the digital line 305. Three of the output taps on the digital delay line 305 are connected through OR gate 315 to the input of AND gate 313.

The output of AND gate 312 is connected to the add terminal 316 on a backward-forward counter 317 while the output of AND gate 313 is connected to a subtract terminal 318 on the backward-forward counter 317.

The backward-forward counter comprises a multiplicity of flip-flops and AND gates connected internally to count up or down from a preset number or from a preset level.

The assertion outputs of each stage which would be at the "one" level when the signal decision level K in the counter are connected to AND gate 319 while all negation outputs are connected to AND gate 320. The inequality takes the form:

$$0 < K\left(\frac{\log \lambda}{\log A + \log\left(\frac{1}{B}\right)} + \frac{\log\left(\frac{1}{B}\right)}{\log A + \log\left(\frac{1}{B}\right)}\right) < K$$

Signal decision is indicated on line terminal 324 and noise on 323.

Figure 4:
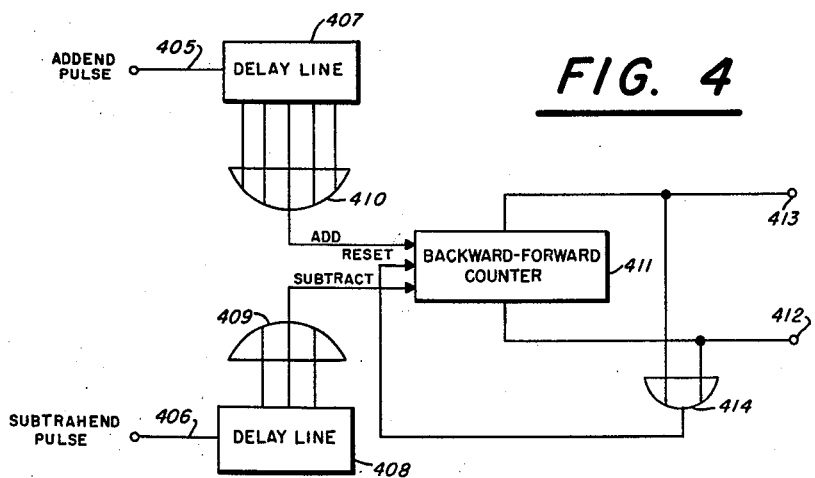
FIG. 4 is another embodiment of the simplified binomial sequential detector incorporating two delay lines.

FIG. 4 represents a modification of FIG. 3 wherein the addend pulses from the binary quantizer of FIG. 1 appear on line 405 and the subtrahend pulses appear on line 406. A pulse appearing on line 405 represents a signal level greater than or equal to the quantizing level an would correspond to an addend pulse while a pulse appearing on line 406 would represent a signal level less than the quantizing level and would correspond to a subtrahend pulse.

The addend pulse on line 405 is coupled to the input of a tapped delay line 407 having five output taps. The subtrahend pulse appearing on line 406 is coupled to a tapped delay line 408 having three output taps which form inputs to OR gate 409. The five output taps on the delay line 407 form five inputs to on OR gate 410.

The add pulse from OR gate 410 and subtract pulse from OR gate 409 are coupled to the input of a backward-forward counter 411 which is preset to a predetermined level and again the negation output of all the flip-flop stages jointly within the backward-forward counter represent a noise only decision pulse at terminal 412 and the assertion outputs of the appropriate flip-flop stages represent a signal decision pulse at output 413 as in the case of FIG. 3. Output pulses at 413 and 412 are coupled through OR gate 414 back to the backward-forward counter and constitute a means of resetting the backward-forward counter to its original level.

In operation, the embodiments of FIGS. 3 and 4 operate in such a fashion that the receiver output voltage or video is controlled for constant level as explained with reference to FIG. 1. Gating and quantization are also accomplished in a similar manner and the quantizer output consists of a single pulse, for each gated input, and is either on the addend or subtrahend line as explained previously.

In the embodiment of FIG. 4 the addend pulse goes to the tapped delay line 407 where it appears at the output as 5 pulses while the subtrahend pulse appearing on line 406 would appear as 3 pulses on the output of delay line 408, i.e., the delay lines 407 and 409 are tapped according to the value of the addend and subtrahend, respectively. In the case of FIG. 4, five is added for the equal or greater than case and a three is subtracted for the less than case. In either case, a train of pulses is applied to the add or subtract line of the backward-forward counter 411.

The backward-forward counter 411 is first preset to the absolute value of the lower bound, a positive integer, and from this point the counter counts up or down according to the inputs on the add or subtract line. Readout is achieved whenever the counter reaches either of two numbers, zero for the noise case and the sum of the absolute value of the lower bound plus the upper bound for the signal case.

The negation output of each stage of the backward-forward counter 411 is coupled into an AND gate and the output of the AND gate indicates a noise decision at the output of the backward-forward counter. The noise decision pulse goes on externally for search control purposes and also resets the backward-forward counter through the OR gate as at 414 or at 322 in the embodiment of FIG. 3. The assertion outputs of the flip-flops in the backward-forward counters of 411 and 317 corresponding to the ones in the binary representation of the previous sum for the signal decision are applied to another AND gate such that a signal decision output pulse occurs when all such places are ones. Exact equality will always be achieved in passing the bounds since the bounds are integers and the addend and subtrahend are entered as sequences of ones and not the binary representations of the same number. A signal decision is used as dictated by tactical purposes and also resets the backward-forward counter through the OR gate 414 or 322.

If the counter of FIG. 3 and FIG. 4 is reset to zero after each test then the lower bound and upper bound are negative and positive integers. The upper bound is handled as before, however, the lower bound requires that the assertion of outputs for ones and the negation outputs for zeros from each stage of the counter corresponding to the ones complement of the lower bound be used.

In the embodiment of FIG. 3 the quantizer output corresponding to an addend or subtrahend pulse is coupled through monostable multivibrators 310 and 311 to form one input to AND gates 312 and 313. At the same time the synchronizing pulse is also coupled to the input of the delay line 305. The output of the delay line in FIG. 3 is tapped to produce a sequence of 5 ones for the addend case and a sequence of 3 ones for the subtrahend case. As shown, the addend pulses are coupled through OR gate 314 and form one input to AND gate 312. When an addend pulse appears on line 306 AND gate 312 will have an output and will couple a sequence of five pulses to the backward-forward counter 317. Conversely, if a subtrahend pulse appears on line 307 a sequence of three pulses will be coupled through OR gate 315 and AND gate 313 to the subtract input of the backward-forward counter 317. The operation of the counter to produce a signal only decision pulse or noise only decision pulse has been explained previously with reference to FIG. 4.

Automatic detection could be extended beyond the simple dichotomy. Rather than merely deciding between signal and noise the automatic detector can be used to decide on many signal and noise alternatives. This decision process constitutes a signal classification process for such additional parameters as velocity, identification, number of objects, track or other relevant characteristics which enter into the decision process. However, the detection processes become more complex both in instrumentation and in terms of performance characteristics. If there are $n$ difference states, including the noise-alone condition, there are then $n$ different possible correct decisions and $(n)$ $(n-1)$ errors. In a particular signal case one of the possible decisions is a true situation and a decision for noise or for any other of the other signal cases is an error. These difficulties reflect upon the complexity of a decision process rather than upon its automation, in that the same complexities exist, even if recognized, in the human decision process. Thus, automatic detection processes provide several distinct advantages over those of their human counterparts in that automatic detection can usually be considered optimum or near optimum in some pertinent sense. When operator detection is used the data handling processes before and after the decision process can be made optimum, but the operator is not too adjustable or amendable in a programming sense.

Additionally, the automatic detector can be programmed to yield any realizable characteristic and these characteristics are statistically stable whereas the human operator varies from day to day and from individual to individual and his characteristics are not statistically stable. Further, an automatic detection system can perform decision functions which would require many operators to even approach the performance of the automatic system. Also, automatic systems are not limited by human reaction time and for this reason alone may be required for many applications.

While the invention has been described with reference to radar systems it is to be understood that various other systems where signal detection is employed, i.e., sonar, communications, radio astronomy, etc. may employ the apparatus and techniques disclosed.

It will be understood that various changes in the details, materials, steps and arrangements of parts, which have been herein described and illustrated in order to explain the nature of the invention, may be made by those skilled in the art within the principle and scope of the invention as expressed in the claims.

What is claimed is:

1. A binomial sequential detector comprising; signal input means for receiving video from a radar system receiver; binary quantizer means including reference level means for comparing said video against a reference level adapted to produce an addend output pulse when said video is equal to or greater than said reference level and a subtrahend pulse when said video is less than said reference level; accumulator means having a preset level for storing and counting said addend and subtrahend pulses, and comparison means for determining when the output of said accumulator means equals and exceeds a predetermined upper bound and lower bound set in said accumulator means where the upper bound is a number proportional to $$\log\left(\frac{1-\beta}{\alpha}\right)$$

and the lower bound is a number proportional to $$\log\left(\frac{\beta}{1-\alpha}\right)$$

$\alpha$ being the desired probability of a false alarm and $\beta$ being the desired probability of a miss.

2. A binomial sequential detector as set forth in claim 1 and further including reset means operatively coupled to said comparison means and receiving output pulses therefrom for resetting said accumulator means to said preset level when said upper bound and lower bound is equaled and exceeded.

3. A binomial sequential detector as set forth in claim 2 wherein said preset level in said accumulator corresponds to a binary number.

4. A binomial sequential detector as set forth in claim 3 wherein said accumulator for storing and registering said addend and subtrahend pulses is a backward forward counter having an add input and a subtract input and a decision for signal output and a decision for noise output, said counter being adapted to count up toward said upper bound when addend pulses are received at said add input and to count down toward said lower bound when subtrahend pulses are received at said subtract input, a decision for signal output occurring when the contents of said accumulator equals and exceeds said upper bound and a decision for noise output occurring when the contents of said accumulator equals and exceeds said lower bound.

5. A binomial sequential detector comprising; signal input means adapted to be connected to the output of a radar system receiver, automatic gain control means operatively coupled to said input means for establishing a reference level, sampling means having inputs and outputs, one of said inputs being coupled to the output of said automatic gain control means for receiving video information, another of said input means on said sampling means being adapted to be connected to the synchronizing pulse output of a radar system receiver and receiving synchronizing pulses therefrom, said sampling means being operable to sample said radar system receiver signal at a desired range corresponding to said synchronizing pulse, second reference level producing means for producing a second reference level, binary quantizer means comprising comparator means operatively coupled to the output of said sampling means and operatively coupled to said second reference level means for comparing the output of said sampling means against said second reference level means and producing an addend pulse when said output pulse from said sampling means exceeds said second reference level and producing a subtrahend pulse when said output of said sampling means is less than said second reference level, accumulator means operatively coupled to said binary quantizer means for storing the addend pulses and subtrahend pulses and comparing said addend pulse and subtrahend pulses against a preset number set in said accumulator, upper bound register means operatively coupled to said accumulator means for storing a number corresponding to an upper bound, lower bound register means operatively coupled to said accumulator for storing a number corresponding to a lower bound, upper bound comparison circuit means operatively coupled to said upper bound register means and said accumulator means for making a decision as to when said upper bound is exceeded and producing a pulse when said bound is exceeded, lower bound comparison means operatively coupled to said lower bound register means and said accumulator means for producing a pulse when said lower bound is reached, and reproducing means operatively coupled to said lower bound comparison circuit means and said upper bound comparison circuit means for presenting said pulses in a desired form.

6. A binomial sequential detector as set forth in claim 5 and further including, reset pulse generator means operatively coupled to said reproducing means for producing a reset pulse when pulses from said upper bound comparison circuit and said lower bound comparison circuit are received for resetting said accumulating means to said preset number.

7. A binomial sequential detector comprising, signal input terminal means adapted to be connected to the output of a radar system receiver, synchronizing pulse input terminal means adapted to be connected to the synchronizing pulse output of a radar system transmitter, sampling means comprising AND gate means operatively coupled to said signal input terminal means and said synchronizing pulse input means for producing an output pulse when said synchronizing pulse and said signal are coincident therein, binary quantizer means operatively coupled to said sampling gate means for producing output pulses therefrom comprising reference level producing means for producing a reference level, comparator means for comparing the output of said sampling gate means against said reference level means and producing an addend pulse when said output of said sampling gate means exceeds or equals the reference level and a subtrahend pulse when the output of said sampling gate means is less than said reference level, accumulating register means operatively coupled to said comparator means and receiving said addend pulses and said subtrahend pulses, said accumulating register means comprising, $n$ number of flip-flop stages, each of said flip-flops having a carry output and a borrow output and being connected sequentially through OR gate means, each of said flip-flops having a set and reset line adapted to be set at a 1 and 0 respectively, each of said flip-flops having an input which causes said flip-flop to toggle, reset means operatively coupled to said set and reset inputs on said $n$ stages of flip-flops for initially establishing a binary coded number with $n$ binary digits, switching means for routing said addend pulses and subtrahend pulses to appropriate flip-flops for initiating a count at the appropriate stage of the accumulating register, said accumulating register so constructed and arranged that a carry output at the $n$th stage flip-flop is indicative of an object present decision and an output at said borrow terminal indicates a noise only decision, said carry output and borrow output of said $n$th stage being connected to said reset means for operatively resetting said accumulator to said initial binary number.

8. A binomial sequential detector comprising; a signal input terminal adapted to be connected to the output of a radar system receiver, a synchronizing pulse input terminal adapted to be connected to the output of a radar system transmitter, automatic gain control means operatively connected to said signal input terminal for establishing the average noise level at a first level, gating means operatively coupled to the output of said automatic gain control means and operatively coupled to said synchronizing pulse input for producing an output pulse when amplified video from the automatic gain control means and synchronizing pulses are coincident therein, binary quantizer means operatively coupled to said gating means and receiving an output therefrom and including second reference level establishing means, comparator means operatively receiving the output from said gating means and from said second reference level establishing means so constructed and arranged that when said output of said sampling means is equal to or exceeds said output from said second reference level establishing means an addend pulse is produced and when said output from said sampling means is less than the output from said second reference level establishing means a subtrahend pulse is produced, delay means operatively coupled to said synchronizing pulse input and having output taps thereon, addend multivibrator means operatively receiving addend pulses from said binary quantizer means and producing output pulses, subtrahend multivibrator means operatively receiving subtrahend pulses from said binary quantizer means and producing output pulses, addend gating means operatively coupled to said number of output taps on said tap delay means for producing a sequence of add pulses when output pulses from said addend multivibrator means and pulses from said tapped delay means are coincident therein, subtrahend gating means operatively coupled to a number of taps on said tapped delay means for producing a sequence of binary subtract pulses when pulses from said tapped delay means and pulses from said subtrahend multivibrator means are coincident therein, backward-forward counter means having add and subtract inputs operatively coupled to said addend gating means and said subtrahend gating means and receiving pulses therefrom and having a reference binary number preset in said backward-forward counter, said backward-forward counter operating in such a manner that a train of pulses corresponding to the output from said addend gating means causes said counter to count up according to the input at said add input and a train of pulses from said subtrahend gating means causes said counter to count down according to the input on the subtract input and said counter reads out whenever said counter reads either of two numbers corresponding to zero for the noise case and the sum of the absolute value of the lower bound plus the upper bound for the signal case, where the upper bound is a number proportional to $$\log\left(\frac{1-\beta}{\alpha}\right)$$

and the lower bound is a number proportional to $$\log\left(\frac{\beta}{1-\alpha}\right)$$

$\alpha$ being the desired probability of a false alarm and $\beta$ being the desired probability of a miss and reproducing means operatively coupled to the output of said backward-forward counter for utilizing the output therefrom to indicate a noise decision or signal decision from said backward-forward counter.

9. A sequential binomial detector comprising; signal input means adapted to be connected to a radar system receiver, synchronizing pulse input means adapted to be coupled to a radar system transmitter, variable gain amplifier means operatively coupled to said signal input means for amplifying video signals applied thereto, automatic gain control means operatively coupled to said variable gain amplifier means for establishing an average noise level, sampling means operatively coupled to the output of said variable gain amplifier means and operatively coupled to said synchronizing pulse input means for producing an output pulse when video and synchronizing pulses are coincident therein, binary quantizer means including reference level establishing means, comparator means operatively coupled to said sampling means and receiving pulses therefrom and receiving the output of said reference level establishing means so constructed and arranged that when said sample pulse from said sampling means is equal to or exceeds the output of said reference level means an addend pulse is produced and when the output from said sampling means is less than the output of said reference level means a subtrahend pulse is produced, addend tapped delay means having output taps thereon operatively coupled to the output of said binary quantizer means corresponding to the addend pulse, subtrahend tapped delay means having output taps thereon operatively coupled to the output of said binary quantizer means corresponding to the subtrahend pulse, backward-forward counter means having a number preset therein and adapted to count down to zero or up to the absolute sum of an upper bound plus the lower bound and having an add and subtract input, said add input being operatively coupled to the outputs on said addend tapped delay means, said subtract input operatively coupled to the output taps on said subtrahend tapped delay means, a signal output line on said backward-forward counter, a noise output line on said backward-forward counter, said backward-forward counter operating in such a manner that said counter counts up or down according to the inputs on said add or subtract line and readout is achieved whenever said counter reaches either zero or the sum of the absolute value of the established lower bound plus the established upper bound where the upper bound is a number proportional to $$\log\left(\frac{1-\beta}{\alpha}\right)$$

and the lower bound is a number proportional to $$\log\left(\frac{\beta}{1-\alpha}\right)$$

$\alpha$ being the desired probability of a false alarm and $\beta$ being the desired probability of a miss.

No references cited.

CHESTER L. JUSTUS, *Primary Examiner.*